Jan. 8, 1935.   G. R. ANCHORS   1,987,459
VEHICLE SIGNAL
Filed April 25, 1933   2 Sheets-Sheet 1
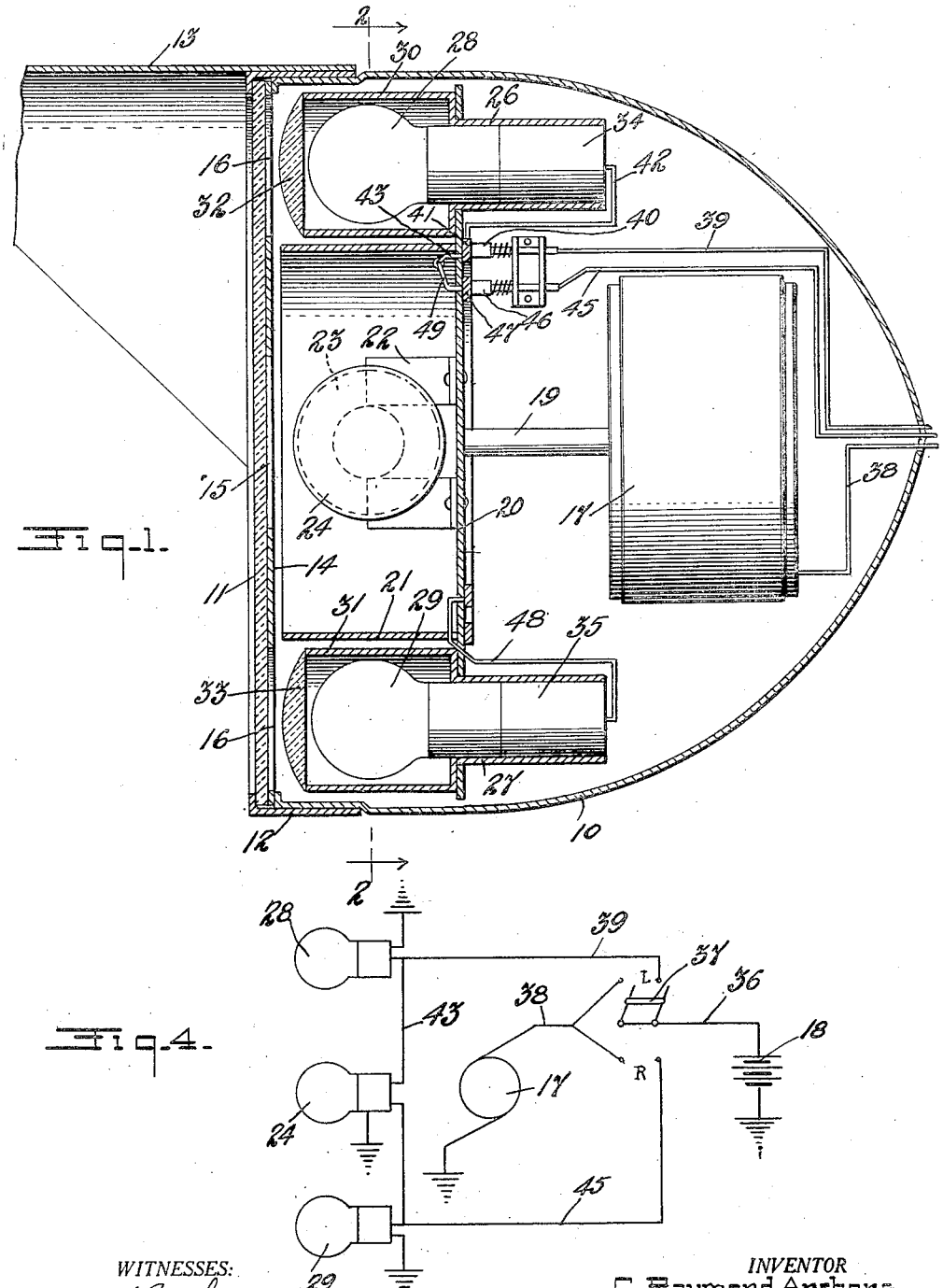

Jan. 8, 1935.  G. R. ANCHORS  1,987,459
VEHICLE SIGNAL
Filed April 25, 1933   2 Sheets—Sheet 2
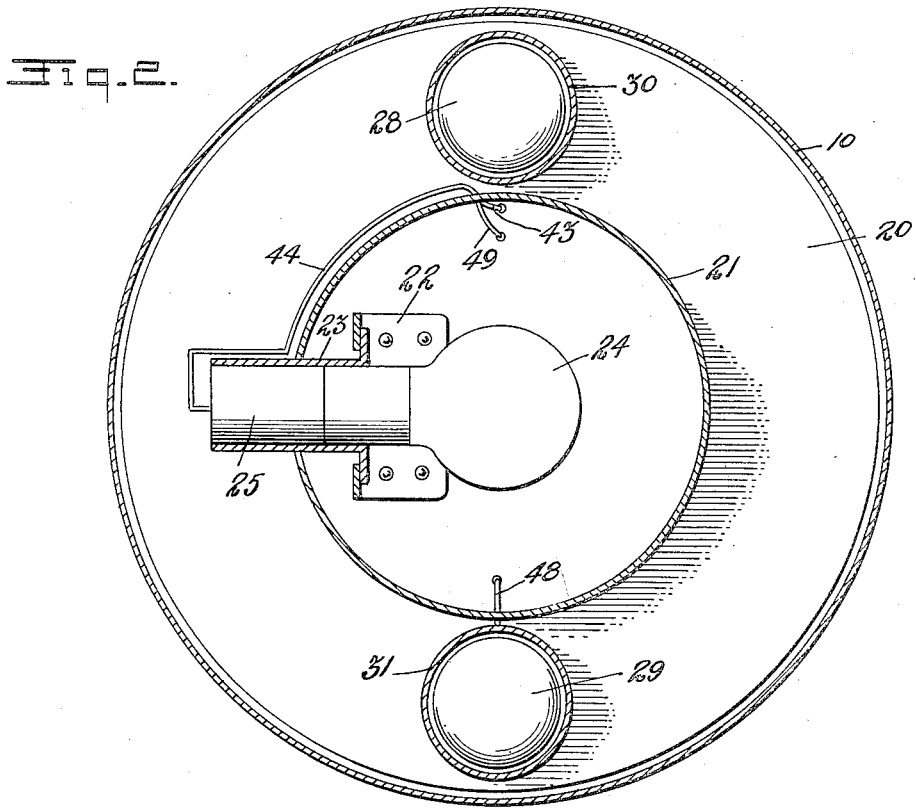
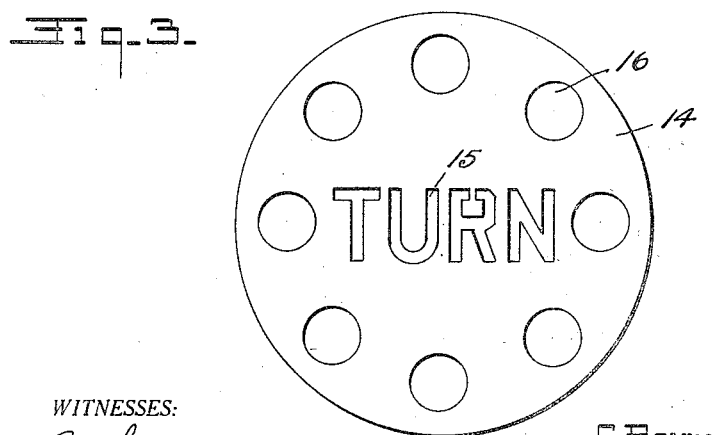
WITNESSES:
INVENTOR
G. Raymond Anchors
BY
Joshua R. H. Potts
HIS ATTORNEY Patented Jan. 8, 1935

1,987,459

UNITED STATES PATENT OFFICE 1,987,459

VEHICLE SIGNAL

George Raymond Anchors, Rutherford, N. J.

Application April 25, 1933, Serial No. 667,777

4 Claims. (Cl. 177—327)

This invention relates to signals for vehicles, and especially a signal to be carried by an automotive vehicle, which will indicate to an observer the intended turn which is to be made by the driver, such indication being effected by the driver manually.

A further object of the invention is to provide a signal of the type in which lights of different colors are energized and moved selectively in accordance with the contemplated turn.

A further object of the invention is to provide a signal device which will indicate plainly that a turn of some kind is to be made, and by the use of moving lights of different colors, indicate which direction the turn is to take.

A further object of the invention is to provide a motor driven member carrying lights which are energized in accordance with the turn to be made, and driven from the motor with means exhibiting the moving lights in series.

The invention, therefore, comprises a housing with a translucent closure therefor, and sections obscured to opacity with a motor mounted within the housing having connection with a part which is moved by the motor, preferably in a rotary direction, one part illuminating a section of the translucent cover, another party carrying light units which are selectively energized and moved by the motor, preferably, though not necessarily, in a rotary direction to exhibit the particular light illuminated through openings in the opaque part of the covering.

In the drawings:—

Figure 1 is a view of the device in vertical and substantially diametrical section, Figure 2 is a sectional view of the device taken on line 2—2 of Figure 1, Figure 3 is a view in elevation of the obscuring and exhibiting part, and Figure 4 is a diagrammatic view of a type of wiring.

Like characters of reference indicate corresponding parts throughout the several views.

The improved vehicle signal which forms the subject-matter of this application, comprises a housing 10 which may be of any approved shape, size or contour, but will preferably be in accordance with the prevailing type of housings used for vehicle lights now or at any future time.

This housing is provided with a closure 11 which may be of transparent, semi-transparent, or translucent material, such for instance as glass in various states of finish. This glass is held to the housing in any approved manner, as by the use of a bezel indicated conventionally at 12.

There is shown at 13 a bonnet to act as a shadow box and protector from the elements.

As shown in the drawings there is located immediately back of the translucent sheet 11 a stencil sheet 14, and the structure will be described in regard to the use of such a stencil sheet, but it is to be understood that the same effect may be accomplished by the application of an obscuring or opaque material directly to the translucent sheet 11.

In either case, the opaque part is provided with a cut-out word, indicated at 15, and with a plurality of marginal openings 16. It is obvious that the particular word shown at Figure 3, or the particular shape of the openings 16 need not be considered as any limitation upon the present invention.

Disposed within the housing 10 is a motor 17. In the drawings this motor is indicated as electrically operated from a source of electricity 18 (see Figure 4). It is to be understood, however, that a motor operated from compressed or attenuated air is fully within the scope of the present invention. In any case, the motor is provided with an arbor 19 which is directly and rigidly attached to a disk 20 which is of such a diameter as to approximately fill the transverse area of the housing, as indicated more particularly at Figures 1 and 2.

There is also provided a collar 21 which is shown in the drawings as being attached to the disk 20. It will be obvious, of course, from a further description of the device, that this collar 21 may as well be attached to the stencil disk 14, but as the stencil disk 14, as has already been described may be eliminated, the collar has been shown as attached to the disk and rotating therewith when driven from the motor 17.

Within the collar 21 is a bracket 22 erected for carrying a light socket 23, which is adapted to contain a double filament, double contact light bulb 24 with the usual connection 25 also secured in this socket 23.

Between the perimeter of the collar 21 and the disk 20 the disk is provided with other light sockets 26 and 27 containing, respectively, bulbs 28 and 29. These latter bulbs 28 and 29 are preferably enclosed within sleeves 30 and 31 which are in turn provided with sub-transparent closures 32 and 33.

The light sockets 26 and 27 are also provided with the contact blocks 34 and 35, for the connection with the wiring. Provision is made for conducting current from the source of energy 18 to the various bulbs just above referred to, and to the motor 17 when such motor is electrically driven. At Figure 4 a diagram of this wiring is shown.

From the source of energy 18, which is grounded upon one side, a wire 36 leads to a double throw double blade switch 37 or its equivalent. When the switch is closed in either direction, current passes through the line 38 to the motor 17 which is grounded upon the opposite side.

When the switch is closed to form communication with the line 39, current will be transmitted through such line to the spring contact 40 and from such contact 40 to the contact ring 41, and thence by the line 42 to the light 28. A branch from this contact ring 41 provides a line 43 as one branch of the line 44 to the light 24.

When the switch 37 is closed in the opposite direction, current passes through the line 45 to the spring contact 46 and to the contact ring 47. This contact ring 47 is connected by the line 48 with the light 29 and also by the branch 49 with the light 24. All of these lights 24, 28 and 29 are grounded upon one side, and are, therefore, energized by a single line.

The two lenses 32 and 33 are presumed to be of contrasting colors, of which red and green may be taken merely as examples, being colors now ordinarily used in traffic regulations. Assuming that the lense 32 is red and that this red signal would indicate the more dangerous or left-hand turn, which was contemplated by the driver, the switch would be closed to energize the line 39 which would in turn energize the light 28, and also the central light 24. The closing of the switch would simultaneously energize the motor 17 so that the disk 20 carrying the light 28 would be rotated the while said light is energized, as is also the central light.

The illuminating of the central light would illuminate the central wording shown upon the stencil plate 14, while the light 28 showing red would rotate in the rear of this stencil plate and would flash intermittently through the series of openings 16.

In case the contemplated turn is to the right, the switch would close, energize the line 45, and light 29, illuminating the lense 33, which, for the purposes has been assumed to be green. The same rotation and the same illumination of the central area would be effected as previously described, but now the flashing light would show green as distinguished from red, in the previous description.

Of course, it is to be understood that the motor 17 might be of the reversible type and that the closing of the switch would reverse the rotation of the motor, so that one of the lights, as for instance, light 28, would rotate in one direction, while the other light, as for instance, the light 29, would rotate in the opposite direction. This, however, is merely a matter of mechanical skill and one to be accomplished by any electrician.

Of course, the vehicle signal herein illustrated may be modified and changed in various ways without departing from the invention herein set forth and hereafter claimed.

I claim:—

1. A vehicle signal comprising a housing having a wall provided with a plurality of transparent areas some of which are arranged in a circular series, a rotor journaled within the housing coaxial with the circular series comprising a central chamber registering with one of the transparent areas, other chambers having parts adapted to transmit differently colored lights and arranged radially relative to the central chamber and registering at times with the areas of the circular series, illuminating elements in said chambers, a motor coupled to drive the rotor, and electric circuits for the illuminating elements each connected to energize the element in the central chamber and the element in one of the radially positioned chambers.

2. A vehicle signal comprising a housing having a wall provided with a plurality of transparent areas some of which coincide with a circle, a rotor journaled within the housing concentric with the circle of transparent areas comprising a central chamber registering with one of the transparent areas, other chambers having means for transmitting differently colored lights arranged radially relative to the central chamber and registering at times with others of said transparent areas, illuminating elements in said chambers transmitting differently colored lights, a motor coupled to drive the rotor, and electric circuits for the illuminating elements each connected to energize the element in the central chamber and the element in one of the radially positioned chambers.

3. A vehicle signal comprising a housing having a wall provided with a plurality of transparent areas some of which coincide with a circle, a rotor journaled within the housing concentric with the circle comprising a central chamber registering with one of the transparent areas, other chambers provided with differently colored light transmitting parts arranged radially relative to the central chamber and registering at times with others of said transparent areas, illuminating elements in said chambers, a motor coupled to drive the rotor, and electric circuits for the illuminating elements each connected to energize the element in the central chamber and the motor and selectively the element in one of the radially positioned chambers.

4. A vehicle signal comprising a housing having a wall provided with a central transparent area and a plurality of transparent areas arranged around said central area, a rotor journaled within the housing comprising a central chamber registering with the central transparent area, other chambers arranged radially relative to the central chamber and registering at times with the other transparent areas, illuminating elements in said chambers transmitting differently colored lights, a motor coupled to drive the rotor, and selectively closed electric circuits for the illuminating elements each connected to energize the element in the central chamber and the motor and the element in one of the radially positioned chambers.

GEORGE RAYMOND ANCHORS.